United States Patent Office 3,641,106
Patented Feb. 8, 1972

---

3,641,106
PROCESS FOR THE CATALYTIC DIMERIZATION OF ACRYLONITRILE
David Arthur Cornforth, Dhafir Yusuf Waddan, and Derek Williams, Manchester, England, assignors to Imperial Chemical Industries Limited, London, England
No Drawing. Continuation-in-part of application Ser. No. 627,680, Apr. 3, 1967. This application Mar. 3, 1969, Ser. No. 803,963
Int. Cl. C07c *121/20, 121/26, 121/30*
U.S. Cl. 260—465.8
5 Claims

ABSTRACT OF THE DISCLOSURE

A process for the dimerization of acrylonitrile which comprises contacting acrylonitrile with a catalyst consisting essentially of (a) a salt or complex of a metal selected from copper, cobalt, nickel, chromium, iron, titanium and vanadium and (b) an aluminum compound having at least one alkyl group of 1–4 carbon atoms directly attached to the aluminum atom, said aluminum atom carrying in addition two other atoms or groups selected from alkyl of 1–4 carbon atoms, alkoxy of 1–4 carbon atoms, hydrogen, chlorine and bromine.

---

This application is a continuation-in-part of our earlier application Ser. No. 627,680 filed Apr. 3, 1967, now abandoned.

This invention relates to the dimerisation of organic compounds which are acceptors in Michael reactions, especially α,β-olefinically unsaturated esters, amides and nitriles.

By the term "acceptors in Michael reactions" we mean compounds containing a group of general formula

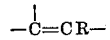

in which the group R is one which activates the double bond. Examples of such compounds may be found in "Organic Name Reactions" by Grauch and Kunz, 194, John Wiley & Sons at page 315, in "Name Reactions in Organic Chemistry" by A. R. Surrey, 2nd edition, 1961, Academic Press, at pages 173 to 174, and in "Name Index of Organic Reactions" by J. E. Gowmans and T. S. Wheeler, 1960, Longmans at pages 169 to 172. Such compounds will be referred to hereinafter as "Michael acceptors."

We have now found that Michael acceptors may be dimerised by using a catalyst comprising a mixture or compound of a metal salt or complex and an aluminium alkyl or aryl.

Thus our invention provides a process for the dimerisation of Michael acceptors by contacting them with a catalyst comprising a mixture or compound of a metal salt or complex and an aluminium alkyl or aryl as hereinafter defined.

The process of our invention is particularly applicable to the dimerisation of α,β-olefinically unsaturated esters, amides and nitriles and especially to the dimerisation of acrylonitrile.

The catalyst comprises a mixture or compound of a salt or complex of a metal and an aluminum alkyl or aryl. The salt of the metal may be the salt of a phenol, for example, p-cresol, or the salt of an acidic ion exchange resin, but is preferably an inorganic acid salt, particularly a chloride or bromide, an organic acid salt, preferably the salt of an aliphatic carboxylic acid having up to 12 carbon atoms, for example, acetic acid or octoic acid, or the salt of an organic enol, preferably an aliphatic enol, for example, acetylacetone.

By metal complex we mean a compound which is formed between a metal salt and an organic ligand in which the electrons available at either the metal atom or the organic ligand are donated to the other to form a coordinated bond. Such complexes are discussed more fully on page 124 of "Advanced Inorganic Chemistry" by F. A. Cotton and G. Wilkinson, 2nd edition, published 1966 by Interscience Publishers (Library of Congress Catalog Card Number 66–20662).

Suitable metal complexes are π-bonded complexes or complexes having metal-oxygen, metal-sulphur, metal-nitrogen or metal-phosphorus coordinate bonds. As examples of suitable ligands there may be mentioned propylene oxide, acrylonitrile, diethyl sulphide or triphenyl phosphine, but preferred ligands are sulphoxides, for example, dimethylsulphoxide, amines, especially tertiary amines, for example, triethylamine, and dienes, for example, 1,5-cyclooctadiene.

The metal in the metal salt or complex may be for example copper or one of the transition metals, for example cobalt, iron, nickel, titanium, vanadium, chromium or palladium. As particular examples of metal salts or complexes there may be mentioned copper (I) chloride, nickel (II) chloride, copper (II) acetylacetonate, cobalt (II) acetylacetonate, nickel (II) acetylacetonate, chromium (III) acetylacetonate, iron (III) acetylacetonate, vanadyl acetylacetonate, copper (II) glycinate, nickel (0) bis(cycloocta-1:5-diene), palladium (II) chloride-triethylamine, copper (II) acetate, cobalt (II) octoate, titanium tetrachloride or tetra-n-butyltitanate. Either an aluminium aryl or an aluminium alkyl may be used in conjunction with a salt or complex of a metal as the catalyst in the present invention, but it is preferred to use an aluminium alkyl.

By aluminium aryls we mean compounds in which three aryl groups are directly attached to the aluminium atom, for example, those in which the aryl group is phenyl, substituted phenyl, diphenyl or naphthyl. As a particular example there may be mentioned triphenyl aluminium.

By aluminium alkyls we mean compounds having at least one alkyl group directly attached to the aluminium atom, which carries in addition two other atoms or groups selected from alkyl, alkoxy hydrogen, chlorine and bromine. The alkyl and alkoxy groups preferably contain from 1 to 4 carbon atoms.

As particular examples of aluminium alkyls there may be mentioned triethylaluminium, diethylaluminium chloride, ethylaluminium dichloride, ethoxydiethylaluminium, secondary butoxy diisobutylaluminium and aluminium diisobutyl hydride, but the preferred compound is triisobutylaluminium.

Co-catalysts such as are used in Ziegler catalysis may also be used.

The catalyst may consist of a mixture of the metal salt or complex and the aluminium alkyl or aryl in various proportions, and a ratio of metal salt or complex to aluminium alkyl or aryl of from 10:1 to 1:10 may be used. It is preferred, however, to use the two components in approximately equal proportions. If desired the metal salt or complex may consist of a mixture of such components and the aluminium alkyl or aryl may also be a mixture of such components.

The catalyst may be used in an amount of from 0.001% to 10.0% by weight based on the weight of Michael acceptor used.

It is already known to dimerise, for example acrylonitrile by the use of certain catalysts, for example phosphines. In such dimerisations, however, the principal product is the dimer, the molecule of which is formed by the attachment of the β-carbon atom of the olefinic bond of one molecule of the monomer to the α-carbon atom of the olefinic bond of another molecule of the monomer. Such dimerisation is conveniently referred to as "head-to-tail" dimerisation. Thus acrylonitrile under the influence of a phosphine catalyst gives mainly 1,3-dicyanobutene-3. By using the catalyst system of our invention, however, there is much greater tendency for head-to-head dimerisation to occur. Thus, in the case of acrylonitrile, significant amounts of 1,4-dicyanobutene-2 or 1,4-dicyanobutene-1 are obtained. In certain cases, particularly when using a copper salt as the metal salt the dimeric product is almost entirely the head-to-head dimer.

Where the monomer to be dimerised, is, for example, an $\alpha,\beta$-olefinically unsaturated ester, amide or nitrile, head-to-head dimerisation results in a molecule having a linear carbon skeleton, whereas head-to-tail dimerisation results in a molecule having a branched carbon skeleton. In certain instances the linear dimeric compounds are more valuable industrially than the branched dimeric compounds. Thus the linear 1,4-dicyanobutenes, obtained by the process of our invention by dimerisation of acrylonitrile may readily be hydrogenated to adiponitrile. From adiponitrile, hexamethylene diamine may be readily obtained by hydrogenation, and this diamine is an intermediate for industrially important synthetic linear fibre forming polyamides, for example, polyhexamethylene adipamide (nylon 66) obtained by polycondensation of the diamine with adipic acid. By contrast the head-to-tail dimer of acrylonitrile, 1,3-dicyanobutene-3, gives on hydrogenation $\alpha$-methylglutaronitrile which on further hydrogenation gives 2-methylpentamethylene diamine, a compound of considerably smaller industrial importance than hexamethylene diamine.

We have also found that if the process of our invention is carried out in the presence of hydrogen or a hydrogen donor a part of the product may be hydrogenated, that is to say the olefinic double bond present in the dimer is replaced by a saturated carbon-carbon bond and this constitutes a further feature of the invention. Thus where acrylonitrile is dimerised according to the process of our invention to give 1,4-dicyanobutene-2, if the reaction is carried out in the presence of hydrogen the product may consist in part of adiponitrile.

The process of our invention may be carried out in either the liquid or vapour phase. It is preferably carried out under anhydrous conditions, and an inert solvent may also be used. As examples of suitable solvents there may be mentioned saturated aliphatic and cycloaliphatic hydrocarbons, aromatic hydrocarbons, chlorinated solvents and ethers. As particular examples of solvents there may mentioned benzene, toluene and chloroform.

If desired the process may be carried out in an inert atmosphere, for example an atmosphere of nitrogen. If desired it may be carried out under pressure, and pressures of from atmospheric pressure to 30 atmospheres pressure may be used.

The reaction may be carried out at temperatures of from $-60°$ to $+200°$ C., but in many cases it may conveniently be carried out at the ordinary temperature. Reaction times of from 2 minutes to 30 hours may be used. After the reaction has proceeded to the desired extent the dimerised product or, in the case where hydrogen is available as a reactant, the hydrodimerised product is isolated by any convenient procedure. For example dilute acid may be added to decompose the catalyst, the reaction mixture filtered to remove any polymeric material, and the product separated from unchanged starting material and any by-products by fractional distillation.

The invention is illustrated but not limited by the following examples in which the parts and percentages are by weight except where otherwise stated and in which the ratio of parts by weight to parts by volume is that of the kilogram to the litre.

In all the examples the reactions were carried out under an atmosphere of nitrogen excepting where otherwise stated.

EXAMPLE 1

Hydrogen was passed through a mixture of copper (II) acetylacetonate (0.255 part), aluminium triisobutyl (0.25 part) and acrylonitrile (8 parts) in chloroform (10 parts by volume) at 10° C. for 20 hours. At the end of the reaction 1,4-dicyanobutene-2-(2.3 parts) was obtained after stripping unreacted acrylonitrile.

EXAMPLE 2

A mixture of cobalt (II) acetylacetonate (0.167 part), aluminium triisobutyl (0.16 part) and acrylonitrile (8 parts) in benzene (4 parts by volume) was kept at room temperature for 48 hours with stirring. At the end of the reaction the product was submitted to gas-liquid chromatographic analysis and shown to consist of unreacted acrylonitrile together with cis-1,4-dicyanobutene-1 and trans-1,4-dicyanobutene-2. After removal of unreacted acrylonitrile 0.85 part of mixed dicyanobutenes was obtained.

EXAMPLE 3

A mixture of nickel (II) acetylacetonate (0.6 part), aluminium triisobutyl (0.45 part) and acrylonitrile (8 parts) in toluene (5 parts by volume) was kept at 160° C. for 24 hours in a sealed tube. The product consisted of unreacted acrylonitrile, a small amount of polymeric material, cis-1,4-dicyanobutene-1 (0.4 part), trans-dicyanobutene-2 (0.7 part) and methylene glutaronitrile.

EXAMPLE 4

A mixture of chromium (III) acetylacetonate (0.48 part), aluminium triisobutyl (0.42 part) and acrylonitrile (parts) in toluene (5 parts by volume) was kept at 160° C. for 24 hours in a sealed tube. The product consisted of unreacted acrylonitrile, a small amount of polymeric material, cis-1,4-dicyanobutene-1 (0.35 part), trans-1,4-dicyanobutene-2, (0.7 part) and methylene glutaronitrile.

EXAMPLE 5

A mixture of iron (III) acetylacetonate (0.4 part), aluminum triisobutyl (0.32 part) and acrylonitrile (8 parts) in toluene (5 parts by volume) was kept at 160° C. for 24 hours. The product consisted of unchanged acrylonitrile, polymeric material, cis-1,4 - dicyanobutene-1 (0.5 part) and methylene glutaronitrile (0.2 part).

EXAMPLE 6

Aluminium triisobutyl (0.1 part by volume) was added at $-10$ C. to a solution of titanium tetrachloride (0.1 part by volume) and dimethyl sulphoxide (0.5 part by volume) in toluene (5 parts by volume). Acrylonitrile (5 parts by volume) was then added and the mixture was kept at room temperature for 15 hours, followed by a period of 2½ hours at 70° C. The mixture was cooled to room temperature and decomposed with 2 N-aqueous hydrochloric acid (2 parts by volume). The organic layer contained cis- and trans-1,4-dicyanobutene-1 with a trace of 1,4-dicyanobutene-2 and adiponitrile as determined by gas-liquid chromatographic analysis. A residue of 0.15 part was obtained when the solvent and unreacted acrylonitrile were removed under vacuum. This residue contained contained 0.14 part of 1,4-dicyanobutenes.

EXAMPLE 7

Aluminium triisobutyl (0.1 part by volume) was added to a solution of tetra-n-butyl titanate (0.1 part by volume) in toluene (5 parts by volume) at $-10°$ C. Acrylonitrile (5 parts by volume) was added and the mixture was kept at room temperature for 18 hours with stirring. The mixture was decomposed with 2 N-aqueous hydrochloric acid (2 parts by volume) and the organic layer was separated. Gas-liquid chromatographic analysis of the organic layer indicated the presence of cis- and trans-1,4-dicyanobutene-1. When the solvent and unreacted acrylonitrile were distilled off under vacuum a residue (0.19 part) was obtained which contained 0.16 part of 1,4-dicyanobutenes.

EXAMPLE 8

Vanadyl acetylacetonate (0.2 part) was dissolved with stirring in toluene (9 parts) under nitrogen and the solution was cooled to −10° C. Aluminium triisobutyl (1 part) dissolved in toluene (5 parts) was added. The nitrogen atmosphere was replaced by hydrogen and acrylonitrile (4 parts) was added dropwise at −10° C. The temperature was allowed to rise to 20° C. and the stirred mixture was then heated under reflux for 2 hours.

Cis-1,4-dicyanobutene-1 (0.15 part) was estimated in the resulting reaction mixture by gas-liquid chromatography.

EXAMPLE 9

Hydrogen was passed through a mixture of copper (II) acetylacetone (0.255 part), aluminium triisobutyl (0.25 part) and acrylonitrile (8 parts) in chloroform (10 parts by volume) at 10° C. for 20 hours. At the end of the reaction an oily residue (2.3 parts) was obtained after stripping unreacted acrylonitrile. On standing, a crystalline solid (0.4 part) was deposited from the residue which was shown by mixed melting point (76° C.) by gas-liquid chromatographic analysis to be 1,4-dicyanobutene-2.

EXAMPLE 10

A mixture of nickel (II) chloride (0.189 part), toluene (3 parts by volume), diethylaluminium chloride (3.2 parts of a 50% solution in toluene) and acrylonitrile (5 parts) was kept at a temperature of 55° C. for 20 hours. The product consisted of unreacted acrylonitrile and 1,4-dicyanobutenes (0.6 part) together with a small amount of polymeric material.

EXAMPLE 11

A mixture of copper (II) acetylacetonate (0.211 part), chloroform (5 parts), secondary butoxy diisobutyl-aluminium (0.96 part of a 20% solution in benzene) and acrylonitrile (10 parts) was kept at room temperature for 20 hours. The product contained 1,4-dicyanobutenes (0.7 part).

EXAMPLE 12

A mixture of copper (II) acetylacetonate (0.178 part), aluminium triisobutyl (0.178 part), benzene (2 parts), dimethylsulphoxide (0.1 part) and acrylonitrile (10 parts) was kept at room temperature for 48 hours with stirring. At the end of this time the mixture was treated with dilute hydrochloric acid and the organic layer was separated and dried. After removal of the benzene and unreacted acrylonitrile an oil residue (2.1 parts) was obtained. Gas-liquid chromatographic analysis indicated the presence of 1,4-dicyanobutene-2 (1.2 parts) and cis- and trans-1,4-dicyanobutene-1 (0.3 part).

EXAMPLE 13

Hydrogen was passed through a mixture of copper (II) acetylacetonate (0.401 part), chloroform (10 parts), aluminium triisobutyl (0.4 part), triethylamine (0.15 part) and acrylonitrile (10 parts) at room temperature for 20 hours. At the end of this time the product was submitted to gas-liquid chromatographic analysis and shown to contain cis- and trans-1,4-dicyanobutene-1 (0.94 part) and adiponitrile (0.2 part).

EXAMPLE 14

A mixture of copper (II) acetylacetonate (0.243 part), toluene (3 parts), 1,5-cyclo-octadiene (0.5 part), aluminium triisobutyl (0.31 part) and acrylonitrile (10 parts) was kept at 60° C. for 3 hours with stirring. At the end of this time the product was submitted to gas-liquid chromatographic analysis and shown to contain 1,4-dicyanobutene-2 together with cis- and trans-1,4-dicyanobutene-1.

EXAMPLE 15

A mixture of copper (I) chloride (0.521 part), toluene (5 parts) aluminium triisobutyl (5.1 parts of a 20% solution in toluene) and acrylonitrile (5 parts) was kept at 60° C. for 3 hours with stirring. At the end of this time the product was submitted to gas-liquid chromatographic analysis and shown to contain 1,4-dicyanobutene-2 (0.3 part).

EXAMPLE 16

A mixture of cobalt (II) octoate (0.37 part), toluene (2 parts), aluminium diisobutyl hydride (0.76 part of a 50% solution in toluene) and acrylonitrile (10 parts) was kept at 120° C. under hydrogen at a pressure of 400 p.s.i. for 6 hours. At the end of this time the product was submitted to gas-liquid chromatographic analysis and shown to contain 1,4-dicyanobutenes (0.7 part) and adiponitrile (4.1 parts).

We claim:
1. A process for the production of 1,4-dicyanobutene-1, 1,4-dicyanobutene-2, 1,3-dicyanobutene-3, adiponitrile and mixtures thereof which comprises contacting acrylonitrile, at a temperature of from −60° C. to 200° C., and optionally in the presence of hydrogen, with a catalyst consisting essentially of (a) a salt or complex of a metal selected from the group consisting of copper, cobalt, nickel, chromium, iron, titanium and vanadium and (b) an aluminium compound having at least one alkyl group of 1–4 carbon atoms directly attached to the aluminium atom, said aluminium atom carrying in addition two other atoms or groups selected from alkyl of 1–4 carbon atoms, alkoxy of 1–4 carbon atoms, hydrogen, chlorine and bromine, the salt forming group being selected from chloride, bromide, aliphatic mono-carboxylic acids having up to 12 carbon atoms and acetylacetone, and the complexes being those formed between said metal salts and an organic ligand selected from the group consisting of dialkyl sulphoxides, tertiary amines and cycloalka-dienes, the ratio of metal salt or complex to aluminium compound being from 10:1 to 1:10.

2. A process as claimed in claim 1 wherein the aluminium alkyl is aluminium triisobutyl.

3. A process as claimed in claim 1 wherein the catalyst comprises the salt or complex of a metal and the aluminium compound in approximately equal proportions.

4. A process as claimed in claim 1 wherein the catalyst is used in an amount of from 0.001% to 10.0% by weight based on the weight of acrylonitrile used.

5. A process as claimed in claim 1 wherein the reaction is carried out in the presence of an inert solvent.

References Cited
UNITED STATES PATENTS 3,484,475  12/1969  Cornforth et al. ____ 260—465.8

JOSEPH PAUL BRUST, Primary Examiner

U.S. Cl. X.R.

260—485 R, 561 R